US012046173B2

(12) United States Patent
Wang et al.

(10) Patent No.: US 12,046,173 B2
(45) Date of Patent: Jul. 23, 2024

(54) DISPLAY PANEL AND DISPLAY DEVICE

(71) Applicant: WUHAN CHINA STAR OPTOELECTRONICS TECHNOLOGY CO., LTD, Wuhan (CN)

(72) Inventors: Yong Wang, Wuhan (CN); Yafeng Li, Wuhan (CN)

( * ) Notice: Subject to any disclaimer, the term of this patent is extended or adjusted under 35 U.S.C. 154(b) by 0 days.

(21) Appl. No.: 17/613,064

(22) PCT Filed: Sep. 29, 2021

(86) PCT No.: PCT/CN2021/121663
§ 371 (c)(1),
(2) Date: Nov. 21, 2021

(87) PCT Pub. No.: WO2023/044946
PCT Pub. Date: Mar. 30, 2023

(65) Prior Publication Data
US 2024/0038113 A1 Feb. 1, 2024

(30) Foreign Application Priority Data
Sep. 24, 2021 (CN) .......................... 202111120307.1

(51) Int. Cl.
*G09G 3/20* (2006.01)

(52) U.S. Cl.
CPC ....... *G09G 3/20* (2013.01); *G09G 2310/0297* (2013.01); *G09G 2310/08* (2013.01)

(58) Field of Classification Search
CPC ......... G09G 2310/0297; G09G 3/3688; G09G 2310/08; G09G 3/3614; G09G 3/3648; G09G 3/3685; G09G 2310/027; G09G 2300/0426; G09G 3/3225
See application file for complete search history.

(56) References Cited

U.S. PATENT DOCUMENTS 10,049,638 B2 * 8/2018 Lin ...................... G09G 3/3648
2008/0278466 A1 11/2008 Joo
(Continued)

FOREIGN PATENT DOCUMENTS

CN 1547731 A 11/2004
CN 101197117 A 6/2008
(Continued)

OTHER PUBLICATIONS

International Search Report in International application No. PCT/CN2021/121663,mailed on Jun. 23, 2022.
(Continued)

*Primary Examiner* — Koosha Sharifi-Tafreshi

(57) ABSTRACT

The present application discloses a display panel and a display device. The display panel includes a plurality of multiplexing drive modules, a plurality of drive branches and M drive buses. By electrically connecting one drive bus to N drive branches, the number of used drive buses can be reduced, thereby reducing the number of output channels of a drive signal source. Sine the number of used drive buses is reduced, the multiplexing drive modules can complete transmission of a frame of data signals using a less number of times of time-divisional parts for switching on transistors.

18 Claims, 3 Drawing Sheets

(56) References Cited

U.S. PATENT DOCUMENTS

| | | | | |
|---|---|---|---|---|
| 2011/0175858 | A1* | 7/2011 | Lee | G09G 3/3688 345/204 |
| 2013/0141320 | A1* | 6/2013 | Kim | G09G 3/3685 345/92 |
| 2013/0300722 | A1 | 11/2013 | Gyouten | |
| 2016/0093260 | A1* | 3/2016 | Watsuda | G09G 3/3611 345/87 |
| 2020/0380927 | A1* | 12/2020 | Al | G09G 3/3614 |

FOREIGN PATENT DOCUMENTS

| | | | |
|---|---|---|---|
| CN | 101458904 | A | 6/2009 |
| CN | 102542973 | A | 7/2012 |
| CN | 103280195 | A | 9/2013 |
| CN | 105047122 | A | 11/2015 |
| CN | 105741735 | A | 7/2016 |
| CN | 106940992 | A | 7/2017 |
| CN | 108550342 | A | 9/2018 |
| CN | 110956927 | A | 4/2020 |
| KR | 20140109697 | A | 9/2014 |

OTHER PUBLICATIONS

Written Opinion of the International Search Authority in International application No. PCT/CN2021/121663,mailed on Jun. 23, 2022.

Chinese Office Action issued in corresponding Chinese Patent Application No. 202111120307.1 dated Dec. 5, 2022, pp. 1-7.

* cited by examiner

DISPLAY PANEL AND DISPLAY DEVICE

FIELD OF THE DISCLOSURE

The present application relates to display technologies, and more particularly to a display panel and a display device.

DESCRIPTION OF RELATED ARTS

For a multiplexing circuit shown in FIG. 1, the multiplexing circuit includes a plurality of multiplexing units. Each multiplexing unit includes two transistors. An initial data signal is fed into input ends of two transistors of a same multiplexing unit simultaneously. Output ends of the two transistors output corresponding target data signals, respectively. For example, a target data signal S1+ and a target data signal S2− are outputted in a time-divisional manner after an initial data signal D1+ passes through two transistors; a target data signal S3+ and a target data signal S4− are outputted in a time-divisional manner after an initial data signal D2− passes through two transistors; a target data signal S5+ and a target data signal S6− are outputted in a time-divisional manner after an initial data signal D3+ passes through two transistors; a target data signal S7+ and a target data signal S8− are outputted in a time-divisional manner after an initial data signal D4− passes through two transistors; a target data signal S9+ and a target data signal S10− are outputted in a time-divisional manner after an initial data signal D5+ passes through two transistors; a target data signal S11+ and a target data signal S12− are outputted in a time-divisional manner after an initial data signal D6− passes through two transistors.

At the same time, the multiplexing circuit needs four different drive signals to realize time-divisional output of corresponding target data signals. Different drive lines are needed for transmission of the drive signals. For example, a first drive line is needed for transmission of a drive signal MUX1, a second drive line is needed for transmission of a drive signal MUX2, a third drive line is needed for transmission of a drive signal MUX3, and a fourth drive line is needed for transmission of a drive signal MUX4.

Therefore, a drive signal source needs four output channels in order to provide the four different drive signals. However, in some situations, the number of the output channels of the drive signal source is limited, and it is restricted to the physical size of the drive signal source. If an increase in the number of the output channels is needed, it will inevitably increase the physical size of the drive signal source. This is a contradiction that is difficult to be compromised.

Furthermore, each transistor has its own parasitic capacitance in the multiplexing circuit. The parasitic capacitance is generated between a gate and a source of the transistor. The electrical reactance suffered by a same drive line become larger as the number of transistors driven by the same drive line increases. As can be known from the fact that the electrical reactance will cause a delay, the decay caused due to transmission of drive signals will become larger as the electrical reactance suffered by the same drive line increases. As a result, the duration of rising edge and/or falling edge of the pulses of the drive signals increases as well. This reduces the time during which the transistor is completely switched on. The impedance between the drain and the source of the transistor that is completely switched on will become lower, and this is equivalent to a transistor having higher driving capacity. For instance, in the existing technical scheme, four drive lines will repeatedly drive four transistors of two multiplexing units one by one. The number of transistors driven by each drive line is large, and this will reduce the driving capacity of each transistor.

Moreover, in the multiplexing circuit as shown in FIG. 1, four times of time-divisional parts are needed for the initial data signal to be switched on to generate a complete frame of target data signal to implement the displaying correspondingly. Accordingly, the time required for lots of times of time-divisional parts for switching on the transistor increases, and thus the transmission efficiency of the data signal is reduced.

Similarly, for a multiplexing circuit shown in FIG. 2, the multiplexing circuit includes a plurality of multiplexing units. Each multiplexing unit includes three transistors. An initial data signal is fed into input ends of three transistors of a same multiplexing unit simultaneously. Output ends of the three transistors output corresponding target data signals, respectively. For example, a target data signal S1+, a target data signal S2− and a target data signal S3+ are outputted in a time-divisional manner after an initial data signal D1+ passes through three transistors; a target data signal S4−, a target data signal S5+ and a target data signal S6− are outputted in a time-divisional manner after an initial data signal D2− passes through three transistors; a target data signal S7+, a target data signal S8− and a target data signal S9+ are outputted in a time-divisional manner after an initial data signal D3+ passes through three transistors; a target data signal S10+, a target data signal S11− and a target data signal S12+ are outputted in a time-divisional manner after an initial data signal D4− passes through three transistors; a target data signal S13+, a target data signal S14− and a target data signal S15+ are outputted in a time-divisional manner after an initial data signal D5+ passes through three transistors; a target data signal S16−, a target data signal S17+ and a target data signal S18− are outputted in a time-divisional manner after an initial data signal D6− passes through three transistors.

At the same time, the multiplexing circuit needs six different drive signals to realize time-divisional output of corresponding target data signals. Different drive lines are needed for transmission of the drive signals. For example, a first drive line is needed for transmission of a drive signal MUX1, a second drive line is needed for transmission of a drive signal MUX2, a third drive line is needed for transmission of a drive signal MUX3, a fourth drive line is needed for transmission of a drive signal MUX4, a fifth drive line is needed for transmission of a drive signal MUX5, and a sixth drive line is needed for transmission of a drive signal MUX6.

Therefore, a drive signal source needs six output channels in order to provide the six different drive signals. However, in some situations, the number of the output channels of the drive signal source is limited, and it is restricted to the physical size of the drive signal source. If an increase in the number of the output channels is needed, it will inevitably increase the physical size of the drive signal source. This is a contradiction that is difficult to be compromised.

Furthermore, each transistor has its own parasitic capacitance in the multiplexing circuit. The parasitic capacitance is generated between a gate and a source of the transistor. The electrical reactance suffered by a same drive line become larger as the number of transistors driven by the same drive line increases. As can be known from the fact that the electrical reactance will cause a delay, the decay caused due to transmission of drive signals will become larger as the electrical reactance suffered by the same drive line increases.

As a result, the duration of rising edge and/or falling edge of the pulses of the drive signals increases as well. This reduces the time during which the transistor is completely switched on. The impedance between the drain and the source of the transistor that is completely switched on will become lower, and this is equivalent to a transistor having higher driving capacity. For instance, in the existing technical scheme, six drive lines will repeatedly drive six transistors of two multiplexing units one by one. The number of transistors driven by each drive line is large, and this will reduce the driving capacity of each transistor.

Moreover, in the multiplexing circuit as shown in FIG. 2, six times of time-divisional parts are needed for the initial data signal to be switched on to generate a complete frame of target data signal to implement the displaying correspondingly. Accordingly, the time required for lots of times of time-divisional parts for switching on the transistor increases, and thus the transmission efficiency of the data signal is reduced.

It should be noted that the afore-described background art is only for easy of clearly and completely understanding the solutions of the present application. The solutions described above are not therefore considered to be known to a person of ordinary skill in the art, merely because they appear in the background section of the present application.

SUMMARY

Technical Problems

The present application provides a display panel and a display device, for alleviating the technical problems of a large number of output channels of the drive signal source needed in the display panel, low driving capacity of the transistors in a multiplexing drive module and low transmission efficiency of the multiplexing drive module.

Technical Solutions

In a first aspect, the present application provides a display panel, including a plurality of multiplexing drive modules, a plurality of drive branches and M drive buses. Each of the multiplexing drive modules including N multiplexing drive groups, each of the multiplexing drive groups including M multiplexing transistors, wherein both N and M are integers greater than or equal to 2; each of the drive branches electrically connected to a gate of one multiplexing transistor in each multiplexing drive module, wherein the number of the drive branches is M*N; and each of the drive buses electrically connected to the N drive branches.

In some implementations, the multiplexing transistors are arranged in order along a first direction; the plurality of drive branches are arranged in order along a second direction; the gate of a Y-th multiplexing transistor in each multiplexing drive module is electrically connected to a Y-th drive branch, wherein Y is a positive integer and is less than or equal to a product of M and N.

In some implementations, the M drive buses are arranged in order along the first direction; a J-th drive bus is electrically connected to a J-th drive branch, a (J+M)-th drive branch and a (J+2*M)-th drive branch, wherein J is a positive integer less than or equal to M.

In some implementations, each of the multiplexing drive modules includes: a first multiplexing drive group, including a first multiplexing transistor and a second multiplexing transistor, in which one of a source and a drain of the first multiplexing transistor is electrically connected to one of the source and the drain of the second multiplexing transistor, and the other one of the source and the drain of the first multiplexing transistor and the other one of the source and the drain of the second multiplexing transistor are used to output different data signals; a second multiplexing drive group, including a third multiplexing transistor and a fourth multiplexing transistor, in which one of the source and the drain of the third multiplexing transistor is electrically connected to one of the source and the drain of the fourth multiplexing transistor, and the other one of the source and the drain of the third multiplexing transistor and the other one of the source and the drain of the fourth multiplexing transistor are used to output different data signals; and a third multiplexing drive group, including a fifth multiplexing transistor and a sixth multiplexing transistor, in which one of the source and the drain of the fifth multiplexing transistor is electrically connected to one of the source and the drain of the sixth multiplexing transistor, and the other one of the source and the drain of the fifth multiplexing transistor and the other one of the source and the drain of the sixth multiplexing transistor are used to output different data signals.

In some implementations, each of the multiplexing drive modules includes a first multiplexing transistor, a second multiplexing transistor, a third multiplexing transistor, a fourth multiplexing transistor, a fifth multiplexing transistor and a sixth multiplexing transistor arranged in order, and the plurality of drive branches include a first drive branch, a second drive branch, a third drive branch, a fourth drive branch, a fifth drive branch and a sixth drive branch arranged in order and in parallel to each other; the first drive branch is electrically connected to the gate of the first multiplexing transistor in each of the multiplexing drive modules; the second drive branch is electrically connected to the gate of the second multiplexing transistor in each of the multiplexing drive modules; the third drive branch is electrically connected to the gate of the third multiplexing transistor in each of the multiplexing drive modules; the fourth drive branch is electrically connected to the gate of the fourth multiplexing transistor in each of the multiplexing drive modules; the fifth drive branch is electrically connected to the gate of the fifth multiplexing transistor in each of the multiplexing drive modules; the sixth drive branch is electrically connected to the gate of the sixth multiplexing transistor in each of the multiplexing drive modules.

In some implementations, the M drive buses includes a first drive bus and a second drive bus, and the first drive bus is electrically connected to the first drive branch, the third drive branch and the fifth drive branch; the second drive bus is electrically connected to the second drive branch, the fourth drive branch and the sixth drive branch.

In some implementations, each of the multiplexing drive modules includes: a first multiplexing drive group, including a first multiplexing transistor, a second multiplexing transistor and a third multiplexing transistor, in which one of a source and a drain of the first multiplexing transistor is electrically connected to one of the source and the drain of the second multiplexing transistor and one of the source and the drain of the third multiplexing transistor, and the other one of the source and the drain of the first multiplexing transistor, the other one of the source and the drain of the second multiplexing transistor and the other one of the source and the drain of the third multiplexing transistor are used to output different data signals; a second multiplexing drive group, including a fourth multiplexing transistor, a fifth multiplexing transistor and a sixth multiplexing transistor, in which one of the source and the drain of the fourth multiplexing transistor is electrically connected to one of the source and the drain of the fifth multiplexing transistor and one of the source and the drain of the sixth multiplexing transistor, and the other one of the source and the drain of the fourth multiplexing transistor, the other one of the source and the drain of the fifth multiplexing transistor and the other one of the source and the drain of the sixth multiplexing transistor are used to output different data signals; and a third multiplexing drive group, including a seventh multiplexing transistor, an eighth multiplexing transistor and a ninth multiplexing transistor, in which one of the source and the drain of the seventh multiplexing transistor is electrically connected to one of the source and the drain of the eighth multiplexing transistor and one of the source and the drain of the ninth multiplexing transistor, and the other one of the source and the drain of the seventh multiplexing transistor, the other one of the source and the drain of the eighth multiplexing transistor and the other one of the source and the drain of the ninth multiplexing transistor are used to output different data signals.

In some implementations, each of the multiplexing drive modules includes a first multiplexing transistor, a second multiplexing transistor, a third multiplexing transistor, a fourth multiplexing transistor, a fifth multiplexing transistor, a sixth multiplexing transistor, a seventh multiplexing transistor, an eighth multiplexing transistor and a ninth multiplexing transistor arranged in order, and the plurality of drive branches include a first drive branch, a second drive branch, a third drive branch, a fourth drive branch, a fifth drive branch, a sixth drive branch, a seventh drive branch, an eighth drive branch and a ninth drive branch arranged in order and in parallel to each other; the first drive branch is electrically connected to the gate of the first multiplexing transistor in each of the multiplexing drive modules; the second drive branch is electrically connected to the gate of the second multiplexing transistor in each of the multiplexing drive modules; the third drive branch is electrically connected to the gate of the third multiplexing transistor in each of the multiplexing drive modules; the fourth drive branch is electrically connected to the gate of the fourth multiplexing transistor in each of the multiplexing drive modules; the fifth drive branch is electrically connected to the gate of the fifth multiplexing transistor in each of the multiplexing drive modules; the sixth drive branch is electrically connected to the gate of the sixth multiplexing transistor in each of the multiplexing drive modules; the seventh drive branch is electrically connected to the gate of the seventh multiplexing transistor in each of the multiplexing drive modules; the eighth drive branch is electrically connected to the gate of the eighth multiplexing transistor in each of the multiplexing drive modules; the ninth drive branch is electrically connected to the gate of the ninth multiplexing transistor in each of the multiplexing drive modules.

In some implementations, the M drive buses includes a first drive bus, a second drive bus and a third drive bus, and the first drive bus is electrically connected to the first drive branch, the fourth drive branch and the seventh drive branch; the second drive bus is electrically connected to the second drive branch, the fifth drive branch and the eighth drive branch; the third drive bus is electrically connected to the third drive branch, the sixth drive branch and the ninth drive branch.

In some implementations, the display panel further includes: a drive generation module, including M output channels, each of the output channels electrically connected to each of drive buses correspondingly.

In some implementations, all of the M multiplexing transistors are low-temperature polysilicon thin-film transistor.

In some implementations, the display panel further includes: a plurality of output data lines, one of the output data lines electrically connected to one of the source and the drain of one of the multiplexing transistors correspondingly; and a plurality of input data lines, one of the input data lines electrically connected to the other one of the source and the drain of the M multiplexing transistors of the same multiplexing drive group.

In a second aspect, the present application provides a display device, which includes the display panel according to any of above implementations and a data driver, and an output end of the data driver is electrically connected to the output end of the plurality of multiplexing drive modules correspondingly.

Beneficial Effects

In the display panel and the display device provided in the present application, a drive bus is electrically connected to N drive branches such that the number of used drive buses can be reduced, thereby reducing the number of output channels of the drive signal source. Also, since the number of used drive buses is reduced, the multiplexing drive module can complete transmission of a frame of data signals using a less number of times of time-divisional parts for switching on the transistors, thereby improving the transmission efficiency of the multiplexing drive module. Also, one drive branch is electrically connected to the gates of a plurality of multiplexing transistors and the plurality of multiplexing transistors are deployed in different multiplexing drive groups, respectively. This can reduce the number of multiplexing transistors driven by each drive branch and reduces the electrical reactance suffered by corresponding drive signals, thereby improving the driving capacity of each multiplexing transistor.

DESCRIPTION OF EMBODIMENTS OF THE DISCLOSURE

To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

Figure 3:
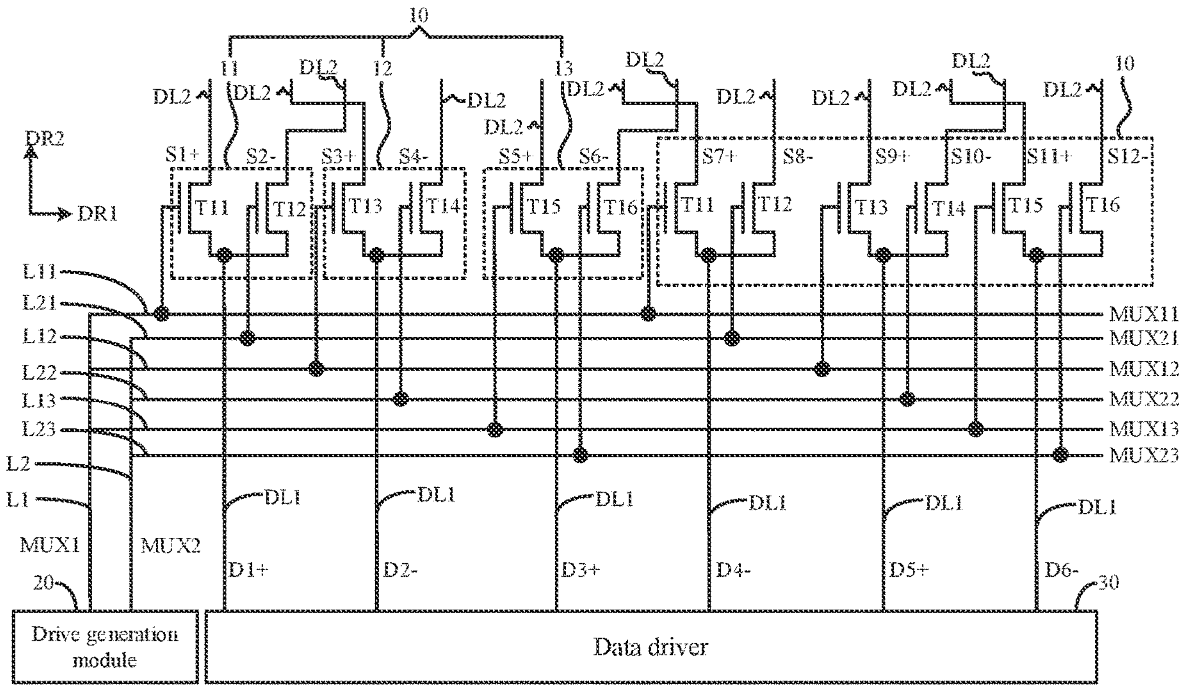
FIG. 3 is a schematic diagram illustrating a structure of a display panel provided in an embodiment of the present application.
Figure 4:
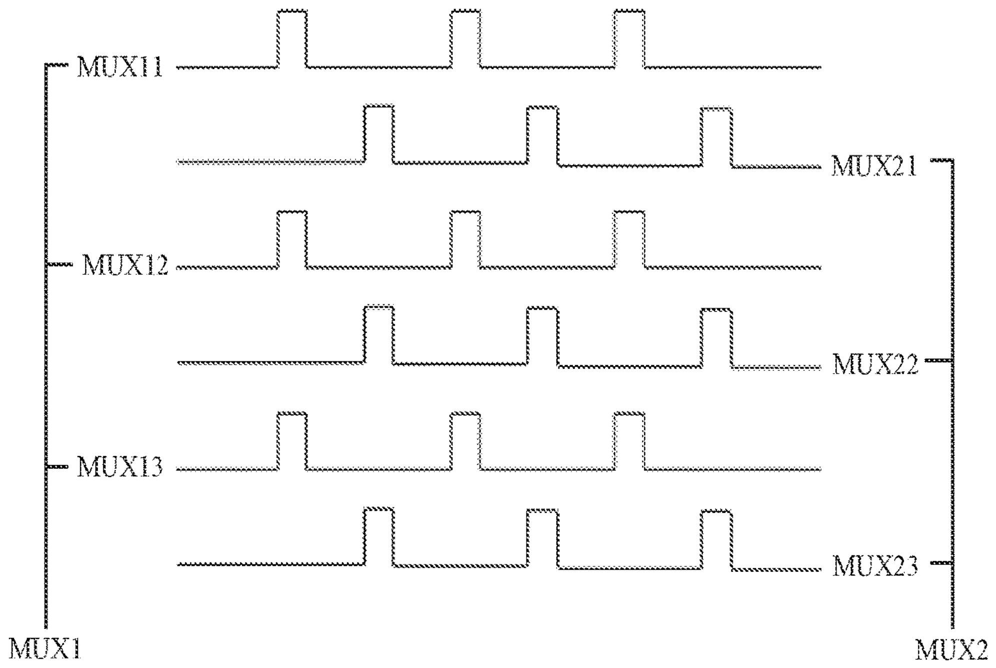
FIG. 4 is a timing diagram of the display panel shown in FIG. 3.
Figure 5:
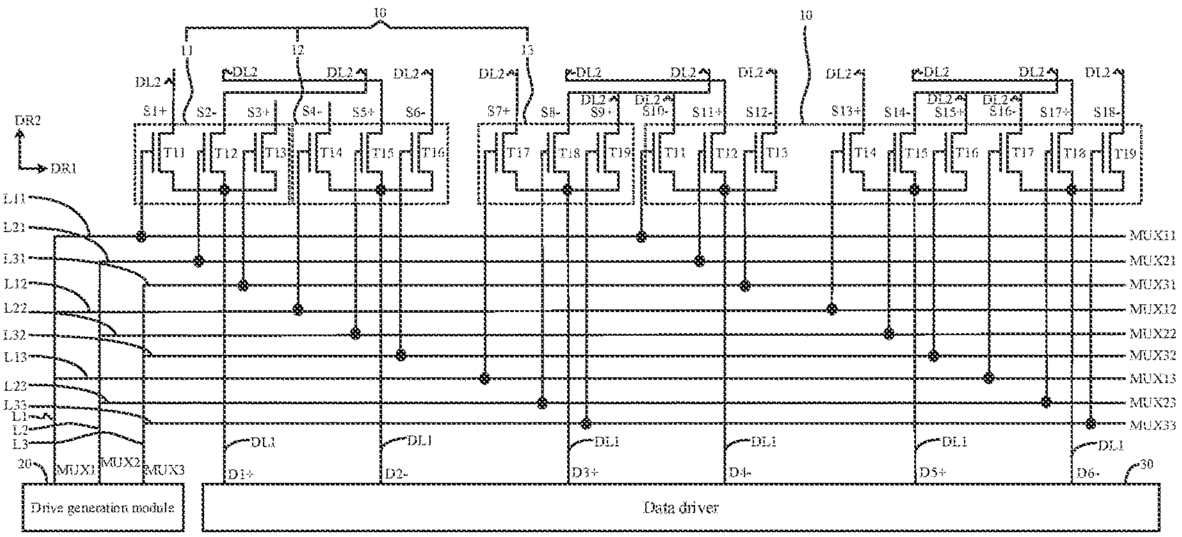
FIG. 5 is a schematic diagram illustrating another structure of a display panel provided in an embodiment of the present application.

Please refer to FIGS. 3 to 6. As shown in FIGS. 3 and 5, the present embodiment provides a display panel, which includes a plurality of multiplexing drive modules 10, a plurality of drive branches and M drive buses. Each of the multiplexing drive modules 10 includes N multiplexing drive groups, and each of the multiplexing drive groups includes M multiplexing transistors, wherein both N and M are integers greater than or equal to 2. Each of the drive branches is electrically connected to a gate of one multiplexing transistor in each multiplexing drive module, wherein the number of the drive branches is M*N. Each of the drive buses is electrically connected to the N drive branches.

The N multiplexing drive groups include a multiplexing drive group 11, a multiplexing drive group 12 and a multiplexing drive group 13, for example. The M multiplexing transistors include, for example, multiplexing transistors T11 to T16 as shown in FIG. 3 or multiplexing transistors T11 to T19 as shown in FIG. 5.

It can be understood that in the display panel provided in the present embodiment, a drive bus is electrically connected to N drive branches such that the number of used drive buses can be reduced, thereby reducing the number of output channels of the drive signal source. Also, since the number of used drive buses is reduced, the multiplexing drive module can complete transmission of a frame of data signals using a less number of times of time-divisional parts for switching on the transistors, thereby improving the transmission efficiency of the multiplexing drive module 10. Also, one drive branch is electrically connected to the gates of a plurality of multiplexing transistors and the plurality of multiplexing transistors are deployed in different multiplexing drive groups, respectively. This can reduce the number of multiplexing transistors driven by each drive branch and reduces the electrical reactance suffered by corresponding drive signals, thereby improving the driving capacity of each multiplexing transistor.

It needs to be noted that in the present embodiment, the number of the drive branches is the product of M and N. One drive branch is electrically connected to the gate of a plurality of multiplexing transistors, and a plurality of multiplexing transistors are deployed in different multiplexing drive groups. It can be understood that as such, a same drive branch will not simultaneously switch on the multiplexing transistors in a same multiplexing drive group, and this can ensure that the multiplexing transistors in a same multiplexing drive group can be transmitted in a time-divisional manner.

In one embodiment, all of the M multiplexing transistors can be any type of amorphous silicon thin-film transistors, metal-oxide thin-film transistors and low-temperature polysilicon thin-film transistors. As being the low-temperature polysilicon thin-film transistors, the M multiplexing transistors can have better mobility and dynamic performance. It is beneficial to further improve the driving capacity and transmission efficiency of the multiplexing transistors.

In one embodiment, the display panel further includes a drive generation module 20. The drive generation module 20 includes M output channels. Each of the output channels is electrically connected to each of drive buses correspondingly.

It can be understood that the output channels are used to transmit different drive signals. One output channel is for transmitting one type of drive signals. Accordingly, it can be reduced or kept the number of used output channels. Also, the space occupied by the drive generation module 20 does not need to be changed or the structure or size of the drive generation module 20 does not need to be redesigned. The drive generation module 20 can be a printed circuit board or a chip for generating corresponding drive signals.

In one embodiment, the display panel further includes a plurality of output data lines DL2 and a plurality of input data lines DL1. One output data line DL2 is electrically connected to one of the source and the drain of one multiplexing transistor correspondingly. One input data line DL1 is electrically connected to the other one of the source and the drain of the M multiplexing transistors of the same multiplexing drive group.

In one embodiment, the multiplexing transistors are arranged in order along a first direction DR1; the plurality of drive branches are arranged in order along a second direction DR2; the gate of a Y-th multiplexing transistor in each multiplexing drive module 10 is electrically connected to a Y-th drive branch, wherein Y is a positive integer and is less than or equal to the product of M and N.

It needs to be noted that the first direction DR1 may differ from the second direction DR2, and the first direction DR1 may also be perpendicular to the second direction DR2.

In one embodiment, the M drive buses are arranged in order along the first direction DR1; a J-th drive bus is electrically connected to a J-th drive branch, a (J+M)-th drive branch and a (J+2*M)-th drive branch, wherein J is a positive integer less than or equal to M.

As shown in FIG. 3, in one embodiment, each of the multiplexing drive modules 10 includes a first multiplexing drive group 11, a second multiplexing drive group 12 and a third multiplexing drive group 13. The first multiplexing drive group 11 includes a first multiplexing transistor T11 and a second multiplexing transistor T12, in which one of the source and the drain of the first multiplexing transistor T11 is electrically connected to one of the source and the drain of the second multiplexing transistor T12, and the other one of the source and the drain of the first multiplexing transistor T11 and the other one of the source and the drain of the second multiplexing transistor T12 are used to output different data signals. The second multiplexing drive group 12 includes a third multiplexing transistor T13 and a fourth multiplexing transistor T14, in which one of the source and the drain of the third multiplexing transistor T13 is electrically connected to one of the source and the drain of the fourth multiplexing transistor T14, and the other one of the source and the drain of the third multiplexing transistor T13 and the other one of the source and the drain of the fourth multiplexing transistor T14 are used to output different data signals. The third multiplexing drive group 13 includes a fifth multiplexing transistor T15 and a sixth multiplexing transistor T16, in which one of the source and the drain of the fifth multiplexing transistor T15 is electrically connected to one of the source and the drain of the sixth multiplexing transistor T16, and the other one of the source and the drain of the fifth multiplexing transistor T15 and the other one of the source and the drain of the sixth multiplexing transistor T16 are used to output different data signals.

As shown in FIG. 3, in one embodiment, each of the multiplexing drive modules 10 includes three multiplexing drive groups. Each multiplexing drive group includes two multiplexing transistors. Each multiplexing drive module includes a first multiplexing transistor T11, a second multiplexing transistor T12, a third multiplexing transistor T13, a fourth multiplexing transistor T14, a fifth multiplexing transistor T15 and a sixth multiplexing transistor T16 arranged in order. The plurality of drive branches include a first drive branch 11, a second drive branch L21, a third drive branch L12, a fourth drive branch L22, a fifth drive branch L13 and a sixth drive branch L23 arranged in order and in parallel to each other. The first drive branch 11 is electrically connected to the gate of the first multiplexing transistor T11 in each of the multiplexing drive modules 10; the second drive branch L21 is electrically connected to the gate of the second multiplexing transistor L12 in each of the multiplexing drive modules 10; the third drive branch L12 is electrically connected to the gate of the third multiplexing transistor T13 in each of the multiplexing drive modules 10; the fourth drive branch L22 is electrically connected to the gate of the fourth multiplexing transistor T14 in each of the multiplexing drive modules 10; the fifth drive branch L13 is electrically connected to the gate of the fifth multiplexing transistor T15 in each of the multiplexing drive modules 10; the sixth drive branch L23 is electrically connected to the gate of the sixth multiplexing transistor T16 in each of the multiplexing drive modules 10.

Figure 1:
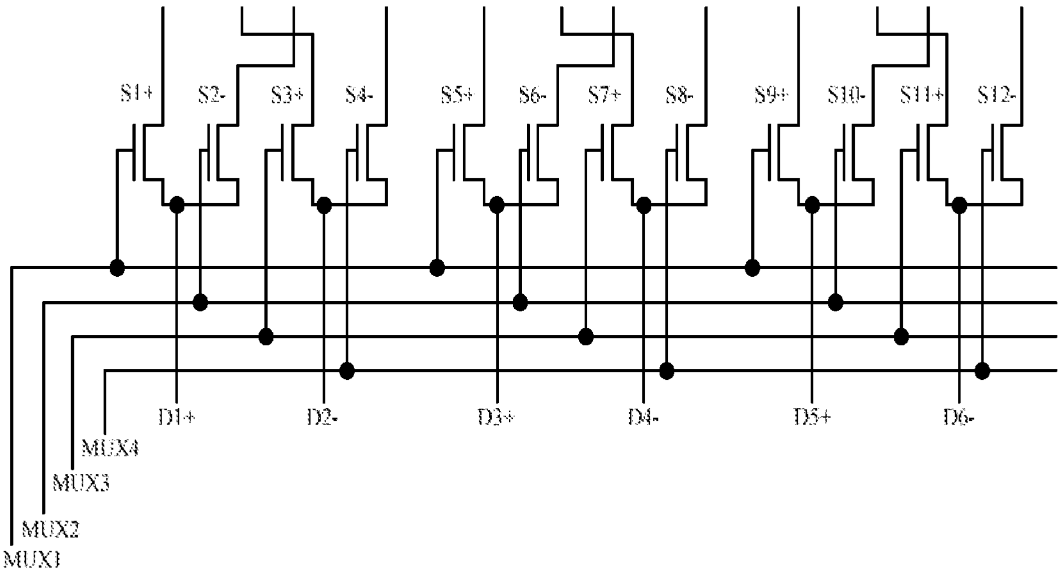
Prior Art FIG. 1
FIG. 1 is a schematic diagram illustrating a structure of a display panel provided in a traditional technical scheme.

It can be understood that compared to FIG. 1, the number of the multiplexing transistors driven by each drive branch in the present embodiment is less than the number of transistors driven by each drive line in FIG. 1. Accordingly, the electrical reactance applied by the multiplexing transistors, suffered by the drive signals in the present embodiment, is relatively lowered. This can reduce the duration of rising edge and/or falling edge of pulses of the drive signals, thereby improving the driving capacity of the multiplexing transistors.

As shown in FIG. 3, in one embodiment, the M drive buses includes a first drive bus L1 and a second drive bus L2, and the first drive bus L1 is electrically connected to the first drive branch L11, the third drive branch L12 and the fifth drive branch L13; the second drive bus L2 is electrically connected to the second drive branch L21, the fourth drive branch L22 and the sixth drive branch L23.

It can be understood that compared to FIG. 1, the two drive buses in the present embodiment is less than the fourth drive buses in FIG. 1. This can reduce the number of output channels as required. At the same time, the transmission of a frame of data signals can be completed with only two times of time-division conduction, which improves the transmission efficiency of the multiplexing drive module 10.

In one of the multiplexing drive modules 10, a target data signal S1+ and a target data signal S2− are outputted after an initial data signal D1+ passes through the multiplexing transistor T11 and the multiplexing transistor T12; a target data signal S3+ and a target data signal S4− are outputted after an initial data signal D2− passes through the multiplexing transistor T13 and the multiplexing transistor T14; a target data signal S5+ and a target data signal S6− are outputted after an initial data signal D3+ passes through the multiplexing transistor T15 and the multiplexing transistor T16.

In another one of the multiplexing drive modules 10, a target data signal S7+ and a target data signal S8− are outputted after an initial data signal D4− passes through the multiplexing transistor T11 and the multiplexing transistor T12; a target data signal S9+ and a target data signal S10− are outputted after an initial data signal D5+ passes through the multiplexing transistor T13 and the multiplexing transistor T14; a target data signal S11+ and a target data signal S12− are outputted after an initial data signal D6− passes through the multiplexing transistor T15 and the multiplexing transistor T16.

The first drive bus L1 is used to transmit a drive signal MUX1, and the second drive bus L2 is used to transmit a drive signal MUX2.

Also, the first drive branch L11 is used to transmit a drive signal MUX11 that is as the same as the drive signal MUX1, the third drive branch L12 is used to transmit a drive signal MUX12 that is as the same as the drive signal MUX1, and the fifth drive branch L13 is used to transmit a drive signal MUX13 that is as the same as the drive signal MUX1. The second drive branch L21 is used to transmit a drive signal MUX21 that is as the same as the drive signal MUX2, the fourth drive branch L22 is used to transmit a drive signal MUX22 that is as the same as the drive signal MUX2, and the sixth drive branch L23 is used to transmit a drive signal MUX23 that is as the same as the drive signal MUX2.

As shown in FIG. 4, the drive signal MUX11, the drive signal MUX12 and the drive signal MUX13 split from the splinted drive signal MUX1 transmitted by the first drive bus L1 flow through the first drive branch L11, the third drive branch L12 and the fifth drive branch L13, respectively, wherein the two multiplexing transistors T11 driven by the first drive branch L11, the two multiplexing transistors T13 driven by the third drive branch L12 and the two multiplexing transistors T15 driven by the fifth drive branch L13 can be switched on or off simultaneously. The drive signal MUX21, the drive signal MUX22 and the drive signal MUX23 split from the splinted drive signal MUX2 transmitted by the second drive bus L2 flow through the second drive branch L21, the fourth drive branch L22 and the sixth drive branch L23, respectively, wherein the two multiplexing transistors T12 driven by the second drive branch L21, the two multiplexing transistors T14 driven by the fourth drive branch L22 and the two multiplexing transistors T16 driven by the sixth drive branch L23 can be switched on or off simultaneously.

As shown in FIG. 5, in one embodiment, each of the multiplexing drive modules 10 includes a first multiplexing drive group 11, a second multiplexing drive group 12 and a third multiplexing drive group 13. The first multiplexing drive group 11 includes a first multiplexing transistor T11, a second multiplexing transistor T12 and a third multiplexing transistor T13, in which one of the source and the drain of the first multiplexing transistor T11 is electrically connected to one of the source and the drain of the second multiplexing transistor T12 and one of the source and the drain of the third multiplexing transistor T13, and the other one of the source and the drain of the first multiplexing transistor T11, the other one of the source and the drain of the second multiplexing transistor T12 and the other one of the source and the drain of the third multiplexing transistor T13 are used to output different data signals. The second multiplexing drive group 12 includes a fourth multiplexing transistor T14, a fifth multiplexing transistor T15 and a sixth multiplexing transistor T16, in which one of the source and the drain of the fourth multiplexing transistor T14 is electrically connected to one of the source and the drain of the fifth multiplexing transistor T15 and one of the source and the drain of the sixth multiplexing transistor T16, and the other one of the source and the drain of the fourth multiplexing transistor T14, the other one of the source and the drain of the fifth multiplexing transistor T15 and the other one of the source and the drain of the sixth multiplexing transistor T16 are used to output different data signals. The third multiplexing drive group 13 includes a seventh multiplexing transistor T17, an eighth multiplexing transistor T18 and a ninth multiplexing transistor T19, in which one of the source and the drain of the seventh multiplexing transistor T17 is electrically connected to one of the source and the drain of the eighth multiplexing transistor T18 and one of the source and the drain of the ninth multiplexing transistor T19, and the other one of the source and the drain of the seventh multiplexing transistor T17, the other one of the source and the drain of the eighth multiplexing transistor T18 and the other one of the source and the drain of the ninth multiplexing transistor T19 are used to output different data signals.

As shown in FIG. 5, in one embodiment, each of the multiplexing drive modules includes a first multiplexing transistor T11, a second multiplexing transistor T12, a third multiplexing transistor T3, a fourth multiplexing transistor T14, a fifth multiplexing transistor T15, a sixth multiplexing transistor T16, a seventh multiplexing transistor T17, an eighth multiplexing transistor T18 and a ninth multiplexing transistor T19 arranged in order, and the plurality of drive branches include a first drive branch 11, a second drive branch L21, a third drive branch L31, a fourth drive branch L12, a fifth drive branch L22, a sixth drive branch L32, a seventh drive branch L13, an eighth drive branch L23 and a ninth drive branch L33 arranged in order and in parallel to each other. The first drive branch L11 is electrically connected to the gate of the first multiplexing transistor T11 in each of the multiplexing drive modules 10; the second drive branch L21 is electrically connected to the gate of the second multiplexing transistor T12 in each of the multiplexing drive modules 10; the third drive branch L31 is electrically connected to the gate of the third multiplexing transistor T13 in each of the multiplexing drive modules 10; the fourth drive branch L12 is electrically connected to the gate of the fourth multiplexing transistor T14 in each of the multiplexing drive modules 10; the fifth drive branch L22 is electrically connected to the gate of the fifth multiplexing transistor T15 in each of the multiplexing drive modules 10; the sixth drive branch L32 is electrically connected to the gate of the sixth multiplexing transistor T16 in each of the multiplexing drive modules 10; the seventh drive branch L13 is electrically connected to the gate of the seventh multiplexing transistor T17 in each of the multiplexing drive modules 10; the eighth drive branch L23 is electrically connected to the gate of the eighth multiplexing transistor T18 in each of the multiplexing drive modules 10; the ninth drive branch L33 is electrically connected to the gate of the ninth multiplexing transistor T19 in each of the multiplexing drive modules 10.

Figure 2:
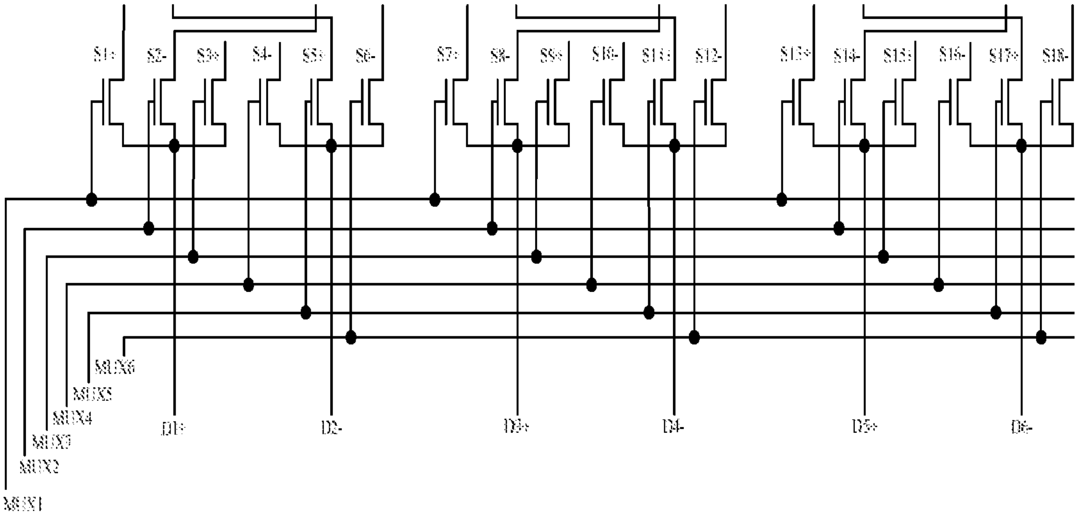
Prior Art FIG. 2
FIG. 2 is a schematic diagram illustrating another structure of a display panel provided in a traditional technical scheme.

It can be understood that compared to FIG. 2, the number of the multiplexing transistors driven by each drive branch in the present embodiment is less than the number of transistors driven by each drive line in FIG. 2. Accordingly, the electrical reactance applied by the multiplexing transistors, suffered by the drive signals in the present embodiment, is relatively lowered. This can reduce the duration of rising edge and/or falling edge of pulses of the drive signals, thereby improving the driving capacity of the multiplexing transistors.

In one embodiment, the M drive buses includes a first drive bus L1, a second drive bus L2 and a third drive bus L3, and the first drive bus L1 is electrically connected to the first drive branch L11, the fourth drive branch L12 and the seventh drive branch L13; the second drive bus L2 is electrically connected to the second drive branch L21, the fifth drive branch L22 and the eighth drive branch L23; the third drive bus L3 is electrically connected to the third drive branch L31, the sixth drive branch L32 and the ninth drive branch L33.

It can be understood that compared to FIG. 2, the three drive buses in the present embodiment is less than the six drive buses in FIG. 2. This can reduce the number of output channels as required. At the same time, three times of time-divisional parts for switching on the transistors are needed to complete transmission of a frame of data signals, thereby improving the transmission efficiency of the multiplexing drive module 10.

In one of the multiplexing drive modules 10, a target data signal S1+, a target data signal S2− and a target data signal S3+ are outputted after an initial data signal D1+ passes through the multiplexing transistor T11, the multiplexing transistor T12 and the multiplexing transistor T13; a target data signal S4−, a target data signal S5+ and a target data signal S6− are outputted after an initial data signal D2− passes through the multiplexing transistor T14, the multiplexing transistor T15 and the multiplexing transistor T16; a target data signal S7+, a target data signal S8− and a target data signal S9+ are outputted after an initial data signal D3+ passes through the multiplexing transistor T17, the multiplexing transistor T18 and the multiplexing transistor T19.

In another one of the multiplexing drive modules 10, a target data signal S10−, a target data signal S11+ and a target data signal S12− are outputted after an initial data signal D4− passes through the multiplexing transistor T11, the multiplexing transistor T12 and the multiplexing transistor T13; a target data signal S13+, a target data signal S14− and a target data signal S15+ are outputted after an initial data signal D5+ passes through the multiplexing transistor T14, the multiplexing transistor T15 and the multiplexing transistor T16; a target data signal S16−, a target data signal S17+ and a target data signal S18− are outputted after an initial data signal D6− passes through the multiplexing transistor T17, the multiplexing transistor T18 and the multiplexing transistor T19.

The first drive bus L1 is used to transmit a drive signal MUX1, the second drive bus L2 is used to transmit a drive signal MUX2, and the third drive bus L3 is used to transmit a drive signal MUX3.

Also, the first drive branch L11 is used to transmit a drive signal MUX11 that is as the same as the drive signal MUX1, the fourth drive branch L12 is used to transmit a drive signal MUX12 that is as the same as the drive signal MUX1, and the seventh drive branch L13 is used to transmit a drive signal MUX13 that is as the same as the drive signal MUX1. The second drive branch L21 is used to transmit a drive signal MUX21 that is as the same as the drive signal MUX2, the fifth drive branch L22 is used to transmit a drive signal MUX22 that is as the same as the drive signal MUX2, and the eighth drive branch L23 is used to transmit a drive signal MUX23 that is as the same as the drive signal MUX2. The third drive branch L31 is used to transmit a drive signal MUX31 that is as the same as the drive signal MUX3, the sixth drive branch L32 is used to transmit a drive signal MUX32 that is as the same as the drive signal MUX3, and the ninth drive branch L33 is used to transmit a drive signal MUX33 that is as the same as the drive signal MUX3.

Figure 6:
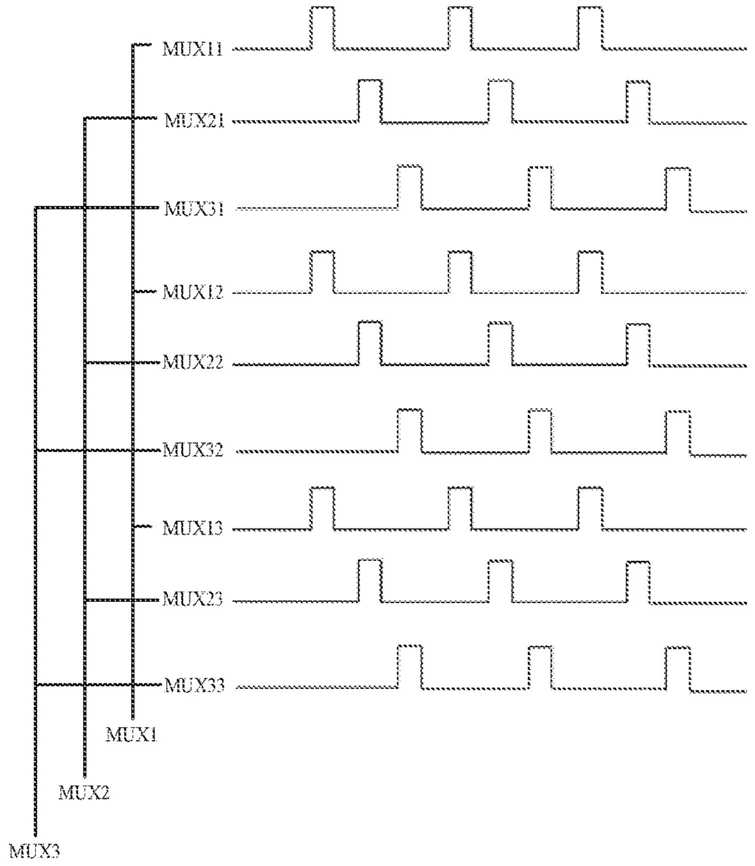
FIG. 6 is a timing diagram of the display panel shown in FIG. 5.

As shown in FIG. 6, the drive signal MUX11, the drive signal MUX12 and the drive signal MUX13 split from the reduce drive signal MUX1 transmitted by the first drive bus L1 flow through the first drive branch L11, the fourth drive branch L12 and the seventh drive branch L13, respectively, wherein the two multiplexing transistors T11 driven by the first drive branch L11, the two multiplexing transistors T14 driven by the fourth drive branch L12 and the two multiplexing transistors T17 driven by the seventh drive branch L13 can be switched on or off simultaneously. The drive signal MUX21, the drive signal MUX22 and the drive signal MUX23 split from the reduce drive signal MUX2 transmitted by the second drive bus L2 flow through the second drive branch L21, the fifth drive branch L22 and the eighth drive branch L23, respectively, wherein the two multiplexing transistors T12 driven by the second drive branch L21, the two multiplexing transistors T15 driven by the fifth drive branch L22 and the two multiplexing transistors T18 driven by the eighth drive branch L23 can be switched on or off simultaneously. The drive signal MUX31, the drive signal MUX32 and the drive signal MUX33 split from the reduce drive signal MUX3 transmitted by the third drive bus L3 flow through the third drive branch L31, the sixth drive branch L32 and the ninth drive branch L33, respectively, wherein the two multiplexing transistors T13 driven by the third drive branch L31, the two multiplexing transistors T16 driven by the sixth drive branch L32 and the two multiplexing transistors T19 driven by the ninth drive branch L33 can be switched on or off simultaneously.

In one embodiment, the present embodiment provides a display device, which includes the display panel according to any of above embodiments and a data driver 30, and an output end of the data driver 30 is electrically connected to the output end of the plurality of multiplexing drive modules 10 correspondingly.

It can be understood that in the display device provided in the present embodiment, a drive bus is electrically connected to N drive branches such that the number of used drive buses can be reduced, thereby reducing the number of output channels of the drive signal source. Also, since the number of used drive buses is reduced, the multiplexing drive module 10 can complete transmission of a frame of data signals using a less number of times of time-divisional parts for switching on the transistors, thereby improving the transmission efficiency of the multiplexing drive module 10. By electrically connecting a drive branch to the gates of multiple multiplexing transistors, which are configured in different multiplexing drive groups, the invention reduces the number of multiplexing transistors driven by each drive branch. This reduction lowers the capacitive impedance encountered by the drive signals, thereby enhancing the driving capability of each multiplexing transistor.

The output end of the data driver 30 is used to output corresponding initial data signals, such as the initial data signal D1+, the initial data signal D2−, and so on.

It should be understood that those of ordinary skill in the art may make equivalent modifications or variations according to the technical schemes and invention concepts of the present application, but all such modifications and variations should be within the appended claims of the present application.

The invention claimed is:

1. A display panel, comprising:

a plurality of multiplexing drive modules, each of the multiplexing drive modules comprising N multiplexing drive groups, each of the multiplexing drive groups comprising M multiplexing transistors, wherein both N and M are integers greater than or equal to 2;

a plurality of drive branches, each of the drive branches electrically connected to a gate of one multiplexing transistor in each multiplexing drive module, wherein the number of the drive branches is M*N, and each of the multiplexing drive modules is electrically connected to the M*N drive branches; and M drive buses, each of the drive buses electrically connected to the N drive branches, enabling synchronous conduction of the multiplexing transistors electrically connected to the same drive bus to output different data signals, wherein the multiplexing transistors are arranged in sequence along a first direction, the plurality of drive branches are arranged in sequence along a second direction, the gate of a Y-th multiplexing transistor in each multiplexing drive module is electrically connected to a Y-th drive branch, the number of the multiplexing transistors connected to the same drive branch is greater than or equal to 2, and Y is a positive integer and is less than or equal to a product of M and N.

2. The display panel of claim 1, wherein the M drive buses are arranged in order along the first direction; a J-th drive bus is electrically connected to a J-th drive branch, a (J+M)-th drive branch and a (J+2*M)-th drive branch, wherein J is a positive integer less than or equal to M.

3. The display panel of claim 2, wherein each of the multiplexing drive modules comprises:

a first multiplexing drive group, comprising a first multiplexing transistor and a second multiplexing transistor, in which one of a source and a drain of the first multiplexing transistor is electrically connected to one of the source and the drain of the second multiplexing transistor, and the other one of the source and the drain of the first multiplexing transistor and the other one of the source and the drain of the second multiplexing transistor are used to output different data signals;

a second multiplexing drive group, comprising a third multiplexing transistor and a fourth multiplexing transistor, in which one of the source and the drain of the third multiplexing transistor is electrically connected to one of the source and the drain of the fourth multiplexing transistor, and the other one of the source and the drain of the third multiplexing transistor and the other one of the source and the drain of the fourth multiplexing transistor are used to output different data signals; and a third multiplexing drive group, comprising a fifth multiplexing transistor and a sixth multiplexing transistor, in which one of the source and the drain of the fifth multiplexing transistor is electrically connected to one of the source and the drain of the sixth multiplexing transistor, and the other one of the source and the drain of the fifth multiplexing transistor and the other one of the source and the drain of the sixth multiplexing transistor are used to output different data signals.

4. The display panel of claim 2, wherein each of the multiplexing drive modules comprises a first multiplexing transistor, a second multiplexing transistor, a third multiplexing transistor, a fourth multiplexing transistor, a fifth multiplexing transistor and a sixth multiplexing transistor arranged in order, and the plurality of drive branches comprise a first drive branch, a second drive branch, a third drive branch, a fourth drive branch, a fifth drive branch and a sixth drive branch arranged in order and in parallel to each other;

the first drive branch is electrically connected to the gate of the first multiplexing transistor in each of the multiplexing drive modules; the second drive branch is electrically connected to the gate of the second multiplexing transistor in each of the multiplexing drive modules; the third drive branch is electrically connected to the gate of the third multiplexing transistor in each of the multiplexing drive modules; the fourth drive branch is electrically connected to the gate of the fourth multiplexing transistor in each of the multiplexing drive modules; the fifth drive branch is electrically connected to the gate of the fifth multiplexing transistor in each of the multiplexing drive modules; the sixth drive branch is electrically connected to the gate of the sixth multiplexing transistor in each of the multiplexing drive modules.

5. The display panel of claim 4, wherein the M drive buses comprises a first drive bus and a second drive bus, and the first drive bus is electrically connected to the first drive branch, the third drive branch and the fifth drive branch; the second drive bus is electrically connected to the second drive branch, the fourth drive branch and the sixth drive branch.

6. The display panel of claim 2, wherein each of the multiplexing drive modules comprises:

a first multiplexing drive group, comprising a first multiplexing transistor, a second multiplexing transistor and a third multiplexing transistor, in which one of a source and a drain of the first multiplexing transistor is electrically connected to one of the source and the drain of the second multiplexing transistor and one of the source and the drain of the third multiplexing transistor, and the other one of the source and the drain of the first multiplexing transistor, the other one of the source and the drain of the second multiplexing transistor and the other one of the source and the drain of the third multiplexing transistor are used to output different data signals;

a second multiplexing drive group, comprising a fourth multiplexing transistor, a fifth multiplexing transistor and a sixth multiplexing transistor, in which one of the source and the drain of the fourth multiplexing transistor is electrically connected to one of the source and the drain of the fifth multiplexing transistor and one of the source and the drain of the sixth multiplexing transistor, and the other one of the source and the drain of the fourth multiplexing transistor, the other one of the source and the drain of the fifth multiplexing transistor and the other one of the source and the drain of the sixth multiplexing transistor are used to output different data signals; and a third multiplexing drive group, comprising a seventh multiplexing transistor, an eighth multiplexing transistor and a ninth multiplexing transistor, in which one of the source and the drain of the seventh multiplexing transistor is electrically connected to one of the source and the drain of the eighth multiplexing transistor and one of the source and the drain of the ninth multiplexing transistor, and the other one of the source and the drain of the seventh multiplexing transistor, the other one of the source and the drain of the eighth multiplexing transistor and the other one of the source and the drain of the ninth multiplexing transistor are used to output different data signals.

7. The display panel of claim 2, wherein each of the multiplexing drive modules comprises a first multiplexing transistor, a second multiplexing transistor, a third multiplexing transistor, a fourth multiplexing transistor, a fifth multiplexing transistor, a sixth multiplexing transistor, a seventh multiplexing transistor, an eighth multiplexing transistor and a ninth multiplexing transistor arranged in order, and the plurality of drive branches comprise a first drive branch, a second drive branch, a third drive branch, a fourth drive branch, a fifth drive branch, a sixth drive branch, a seventh drive branch, an eighth drive branch and a ninth drive branch arranged in order and in parallel to each other;

the first drive branch is electrically connected to the gate of the first multiplexing transistor in each of the multiplexing drive modules; the second drive branch is electrically connected to the gate of the second multiplexing transistor in each of the multiplexing drive modules; the third drive branch is electrically connected to the gate of the third multiplexing transistor in each of the multiplexing drive modules; the fourth drive branch is electrically connected to the gate of the fourth multiplexing transistor in each of the multiplexing drive modules; the fifth drive branch is electrically connected to the gate of the fifth multiplexing transistor in each of the multiplexing drive modules; the sixth drive branch is electrically connected to the gate of the sixth multiplexing transistor in each of the multiplexing drive modules; the seventh drive branch is electrically connected to the gate of the seventh multiplexing transistor in each of the multiplexing drive modules; the eighth drive branch is electrically connected to the gate of the eighth multiplexing transistor in each of the multiplexing drive modules; the ninth drive branch is electrically connected to the gate of the ninth multiplexing transistor in each of the multiplexing drive modules.

8. The display panel of claim 7, wherein the M drive buses comprises a first drive bus, a second drive bus and a third drive bus, and the first drive bus is electrically connected to the first drive branch, the fourth drive branch and the seventh drive branch;

the second drive bus is electrically connected to the second drive branch, the fifth drive branch and the eighth drive branch;

the third drive bus is electrically connected to the third drive branch, the sixth drive branch and the ninth drive branch.

9. The display panel of claim 1, further comprising:

a drive generation module, comprising M output channels, each of the output channels electrically connected to each of drive buses correspondingly.

10. The display panel of claim 1, wherein all of the M multiplexing transistors are low-temperature polysilicon thin-film transistor.

11. The display panel of claim 1, further comprising:

a plurality of output data lines, one of the output data lines electrically connected to one of the source and the drain of one of the multiplexing transistors correspondingly; and a plurality of input data lines, one of the input data lines electrically connected to the other one of the source and the drain of the M multiplexing transistors of the same multiplexing drive group.

12. A display device, comprising:

a display panel as claimed in claim 1; and a data driver, an output end of the data driver electrically connected to the output end of the plurality of multiplexing drive modules correspondingly.

13. The display device of claim 12, wherein the M drive buses are arranged in order along the first direction; a J-th drive bus is electrically connected to a J-th drive branch, a (J+M)-th drive branch and a (J+2*M)-th drive branch, wherein J is a positive integer less than or equal to M.

14. The display device of claim 13, wherein each of the multiplexing drive modules comprises:

a first multiplexing drive group, comprising a first multiplexing transistor and a second multiplexing transistor, in which one of a source and a drain of the first multiplexing transistor is electrically connected to one of the source and the drain of the second multiplexing transistor, and the other one of the source and the drain of the first multiplexing transistor and the other one of the source and the drain of the second multiplexing transistor are used to output different data signals;

a second multiplexing drive group, comprising a third multiplexing transistor and a fourth multiplexing transistor, in which one of the source and the drain of the third multiplexing transistor is electrically connected to one of the source and the drain of the fourth multiplexing transistor, and the other one of the source and the drain of the third multiplexing transistor and the other one of the source and the drain of the fourth multiplexing transistor are used to output different data signals; and a third multiplexing drive group, comprising a fifth multiplexing transistor and a sixth multiplexing transistor, in which one of the source and the drain of the fifth multiplexing transistor is electrically connected to one of the source and the drain of the sixth multiplexing transistor, and the other one of the source and the drain of the fifth multiplexing transistor and the other one of the source and the drain of the sixth multiplexing transistor are used to output different data signals.

15. The display device of claim 13, wherein each of the multiplexing drive modules comprises a first multiplexing transistor, a second multiplexing transistor, a third multiplexing transistor, a fourth multiplexing transistor, a fifth multiplexing transistor and a sixth multiplexing transistor arranged in order, and the plurality of drive branches comprise a first drive branch, a second drive branch, a third drive branch, a fourth drive branch, a fifth drive branch and a sixth drive branch arranged in order and in parallel to each other;

the first drive branch is electrically connected to the gate of the first multiplexing transistor in each of the multiplexing drive modules; the second drive branch is electrically connected to the gate of the second multiplexing transistor in each of the multiplexing drive modules; the third drive branch is electrically connected to the gate of the third multiplexing transistor in each of the multiplexing drive modules; the fourth drive branch is electrically connected to the gate of the fourth multiplexing transistor in each of the multiplexing drive modules; the fifth drive branch is electrically connected to the gate of the fifth multiplexing transistor in each of the multiplexing drive modules; the sixth drive branch is electrically connected to the gate of the sixth multiplexing transistor in each of the multiplexing drive modules.

16. The display device of claim 15, wherein the M drive buses comprises a first drive bus and a second drive bus, and the first drive bus is electrically connected to the first drive branch, the third drive branch and the fifth drive branch; the second drive bus is electrically connected to the second drive branch, the fourth drive branch and the sixth drive branch.

17. The display device of claim 13, wherein each of the multiplexing drive modules comprises:

a first multiplexing drive group, comprising a first multiplexing transistor, a second multiplexing transistor and a third multiplexing transistor, in which one of a source and a drain of the first multiplexing transistor is electrically connected to one of the source and the drain of the second multiplexing transistor and one of the source and the drain of the third multiplexing transistor, and the other one of the source and the drain of the first multiplexing transistor, the other one of the source and the drain of the second multiplexing transistor and the other one of the source and the drain of the third multiplexing transistor are used to output different data signals;

a second multiplexing drive group, comprising a fourth multiplexing transistor, a fifth multiplexing transistor and a sixth multiplexing transistor, in which one of the source and the drain of the fourth multiplexing transistor is electrically connected to one of the source and the drain of the fifth multiplexing transistor and one of the source and the drain of the sixth multiplexing transistor, and the other one of the source and the drain of the fourth multiplexing transistor, the other one of the source and the drain of the fifth multiplexing transistor and the other one of the source and the drain of the sixth multiplexing transistor are used to output different data signals; and a third multiplexing drive group, comprising a seventh multiplexing transistor, an eighth multiplexing transistor and a ninth multiplexing transistor, in which one of the source and the drain of the seventh multiplexing transistor is electrically connected to one of the source and the drain of the eighth multiplexing transistor and one of the source and the drain of the ninth multiplexing transistor, and the other one of the source and the drain of the seventh multiplexing transistor, the other one of the source and the drain of the eighth multiplexing transistor and the other one of the source and the drain of the ninth multiplexing transistor are used to output different data signals.

18. The display device of claim 13, wherein each of the multiplexing drive modules comprises a first multiplexing transistor, a second multiplexing transistor, a third multiplexing transistor, a fourth multiplexing transistor, a fifth multiplexing transistor, a sixth multiplexing transistor, a seventh multiplexing transistor, an eighth multiplexing transistor and a ninth multiplexing transistor arranged in order, and the plurality of drive branches comprise a first drive branch, a second drive branch, a third drive branch, a fourth drive branch, a fifth drive branch, a sixth drive branch, a seventh drive branch, an eighth drive branch and a ninth drive branch arranged in order and in parallel to each other;

the first drive branch is electrically connected to the gate of the first multiplexing transistor in each of the multiplexing drive modules; the second drive branch is electrically connected to the gate of the second multiplexing transistor in each of the multiplexing drive modules; the third drive branch is electrically connected to the gate of the third multiplexing transistor in each of the multiplexing drive modules; the fourth drive branch is electrically connected to the gate of the fourth multiplexing transistor in each of the multiplexing drive modules; the fifth drive branch is electrically connected to the gate of the fifth multiplexing transistor in each of the multiplexing drive modules; the sixth drive branch is electrically connected to the gate of the sixth multiplexing transistor in each of the multiplexing drive modules; the seventh drive branch is electrically connected to the gate of the seventh multiplexing transistor in each of the multiplexing drive modules; the eighth drive branch is electrically connected to the gate of the eighth multiplexing transistor in each of the multiplexing drive modules; the ninth drive branch is electrically connected to the gate of the ninth multiplexing transistor in each of the multiplexing drive modules.

* * * * *